United States Patent [19]

Kuzmik et al.

[11] 4,384,307

[45] May 17, 1983

[54] FACSIMILE COMMUNICATIONS INTERFACE ADAPTER

[75] Inventors: Paul T. Kuzmik, Gaithersberg, Md.; Leo J. Cotta, Springfield, Va.

[73] Assignee: Inteq, Inc., Fairfax, Va.

[21] Appl. No.: 70,292

[22] Filed: Aug. 28, 1979

[51] Int. Cl.³ .............................................. H04N 1/40
[52] U.S. Cl. ................................. 358/257; 179/2 DP; 358/903; 358/264; 364/514; 375/7
[58] Field of Search ............... 358/257, 256, 280, 903, 358/264; 179/2 DP; 364/514; 375/7

[56] References Cited

U.S. PATENT DOCUMENTS

| | | | |
|---|---|---|---|
| 3,751,582 | 8/1973 | Wernikoff | 358/257 |
| 3,958,088 | 5/1976 | Vieri | 358/257 |
| 4,007,443 | 2/1977 | Bromberg | 179/2 DP |
| 4,079,452 | 3/1978 | Larson | 364/900 |
| 4,093,823 | 6/1978 | Chu | 370/80 |

*Primary Examiner*—Howard Britton

[57] ABSTRACT

A communications adapter for interfacing a transceiver and a line including a synchronous receiver-transmitter programmed by a controller to operate the receiver-transmitter in different data formats during a single frame transmission to or reception from a transmitter/receiver and including logic programmed by a controller for controlling the operation of a transmitter/receiver on a bit level to halt the transmitter/receiver during programming changes of format between and during a frame. For frame transmission to a transmitter/receiver, the receiver-transmitter is programmed for a first portion of a frame for a number of bits per character as a function of transmitter/receiver and line protocol and for second portion of a frame for a number of bits per character as a function of line protocol. For frame reception from a transmitter/receiver, the receiver-transmitter is programmed for a number of bits per character as a function of line protocol and a synchronization pattern as a function of line and transmitter/receiver protocol.

21 Claims, 7 Drawing Figures

TRANSMISSION-TO-DEVICE FRAME

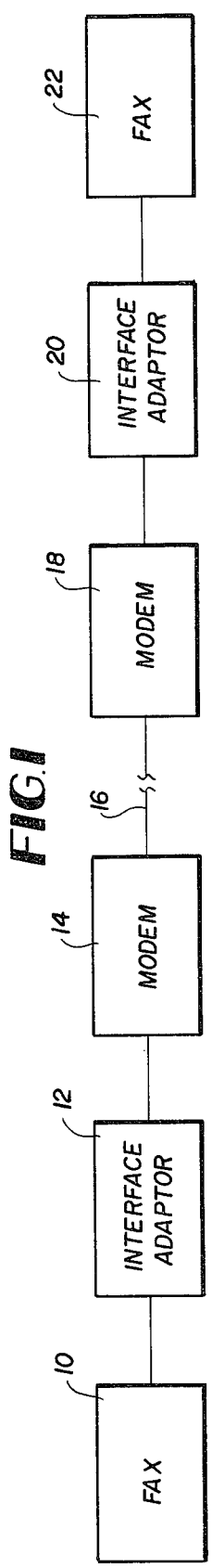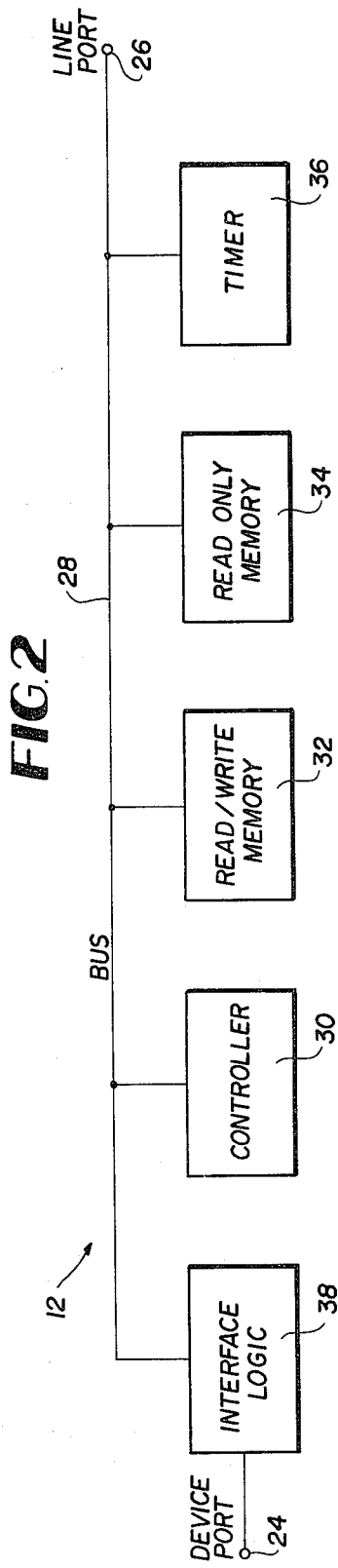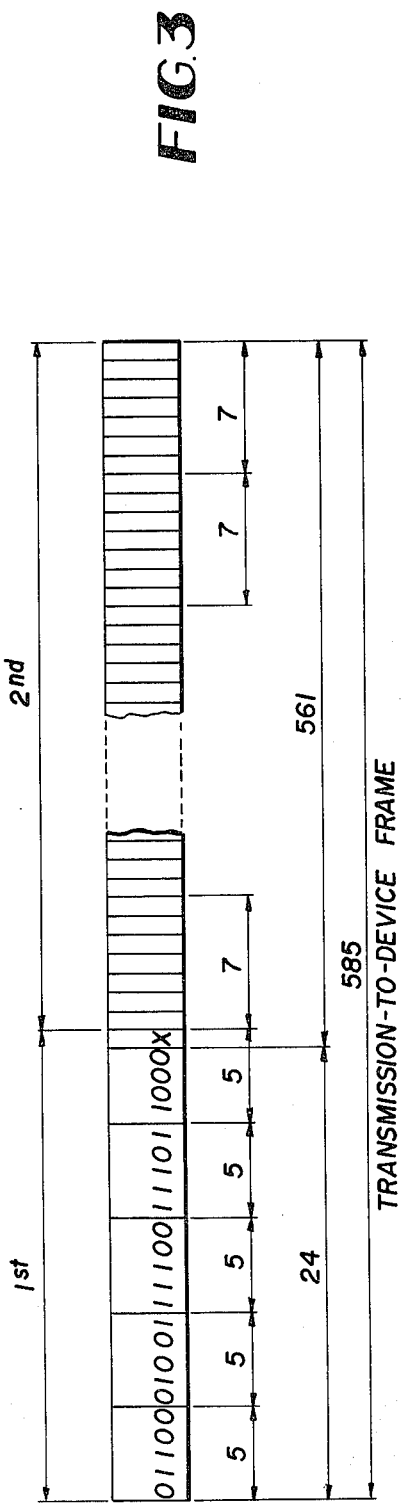

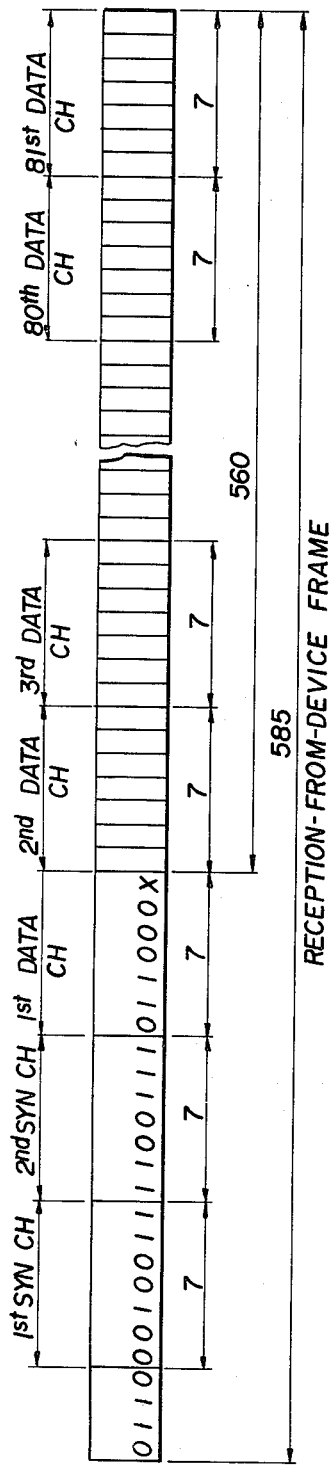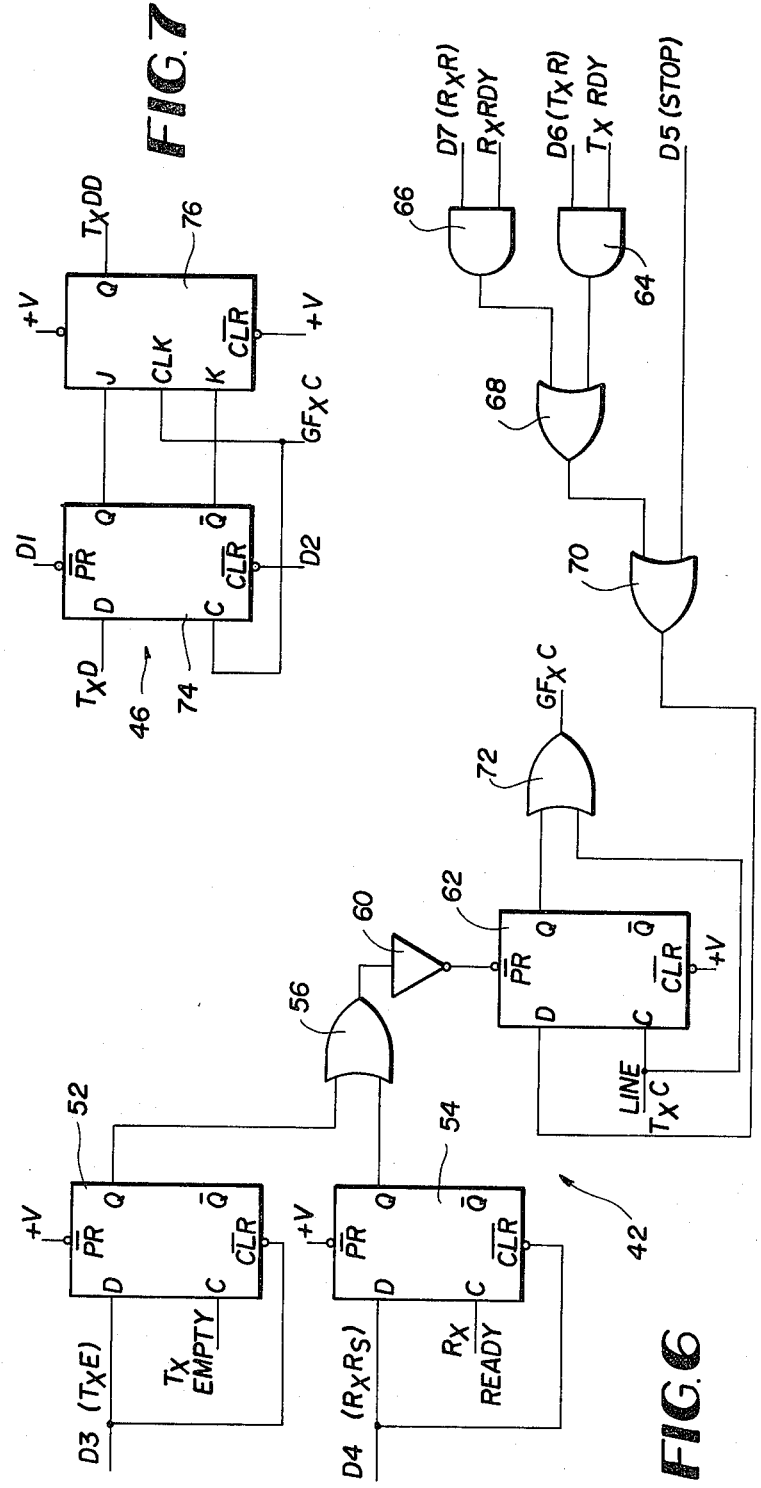

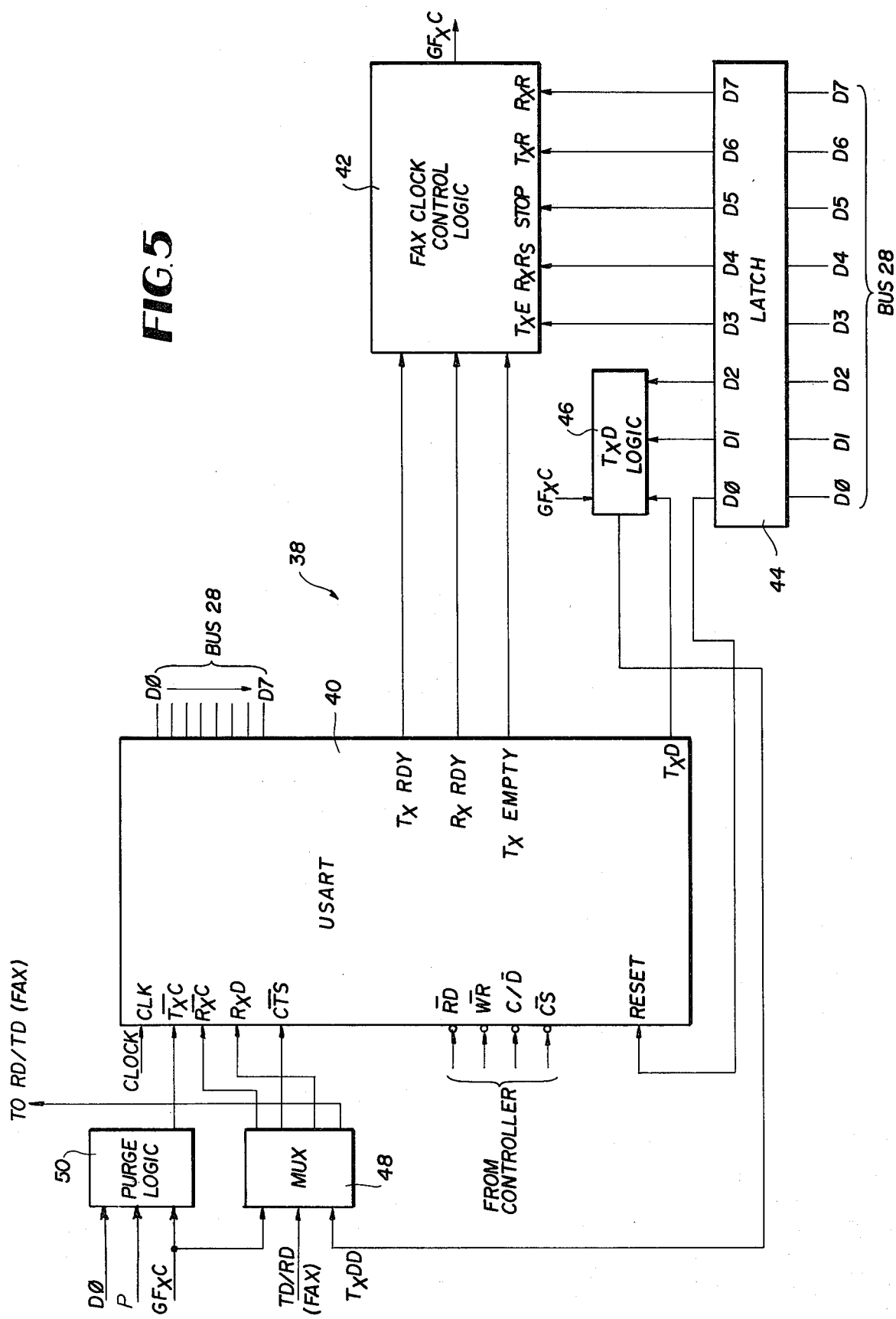

FACSIMILE COMMUNICATIONS INTERFACE ADAPTER

BACKGROUND OF THE INVENTION

The present invention relates generally to communication interface adapters and more specifically to an adapter for interfacing a line with a transmitter/receiver which has an unusual protocol.

With the advent of microelectronics, the size of interface adapters have been substantially reduced without a reduction in sophistication. The typical interface adapter may now include a microcomputer and a universal synchronous or asynchronous receiver/transmitter (US/ART). The microcomputer will include a processor and memory wherein the memory is capable of providing the necessary information to program the US/ART to interface the protocol of a device and a line. Typical examples are found in U.S. Pat. Nos. 4,007,443 and 4,093,823. The memory may include a programmable portion which is capable of being written into and read from as well as read only memories which contain particular programming instructions depending upon the device and line to be interfaced. Examples of using Read Only Memories to taylor interface adapters are shown in U.S. Pat. Nos. 3,751,582 and 4,079,452.

In general, the US/ARTs are programmed for a given bits per character for transmission and the same or different number of character bits for reception from the device. The device is controlled by logic inputs and outputs such that once it is activated it continues to transmit until the transmission or reception is finished or frame synchronization is lost. Thus the control of the device by the interface adapter is performed on a frame level. This type of control has been suitable for many situations, but has been found to be unsuitable for specific types of devices. To be more specific, devices having a frame protocol which is completely diverse from the line protocol have been impossible to interface without the use of extensive electronic components and systems. This has made the interface large and expensive as well as requiring undesirable execution time for the interface conversion. For example, a RAPICOM Model 412 or 450 digital facsimile machine has a frame consisting of 585 bits of information of which the first 24 bits are used for synchronization and 561 bits are data which must be transmitted to the line. Using a standard 5, 6, 7, or 8 bits per frame as the line protocol, it is difficult to conveniently handle the 561 bits of data without using a large number of electronic elements and storage. Thus there exists a need for an inexpensive, small and fast processing interface device to handle odd sized frame formats.

SUMMARY OF THE INVENTION

An object of the present invention is to provide a communication interface adapter which can handle difficult device protocols.

Another object is to provide an interface communication adapter which is inexpensive, small in size and capable of rapid operation.

A further object of the invention is to provide an interface between a synchronous line and digital fascimile machine with bit level control of the fascimile device.

The objects of the present invention are obtained by providing bit level control of the transmission and reception of a transmitter/receiver device (for example, a fascimile device) by the interface adapter and by maximizing the programming capability of a USRT. The interface adapter includes a controller or microcomputer for controlling the operation of the adapter, storage for storing instructions to be used by the controller, device and line ports, a programmable synchronous receiver-transmitter for interfacing the protocols of the device and line ports and logic circuitry for controlling the transmission and reception of the transmitter/receiver device on the device port with the interface adapter on a bit level.

The Controller programs the receiver-transmitter to a first number of bits per character for a first portion of a frame transmission to the device port as a function of the number of bits per frame of the device port protocol and the number of bits per character of the line port protocol. For the remaining portion of a frame transmission to the device port, the Controller programs the receiver-transmitter to a second number of bits per character as a function of the bits per character of the line port protocol. The logic is programmed to sense the condition of the receiver-transmitter and provides a signal to halt the operation of the device on the device port during programming of the receiver-transmitter. This is accomplished by controlling the clock of the device on the device port. More specifically, the first number of bits per character is a function of the number of synchronization bits of the device port protocol and is a function of the remainder of the quotient of the data bits of the device port protocol divided by the second number of bits per character. The synchronization bits of the device port protocol are provided to the receiver-transmitter from storage and combined with the remainder during the first portion of a frame transmission to the device port. The remaining data received for the frame are transmitted at the second number of bits per character. The Controller programs the logic to purge one bit from the receiver-transmitter after programming of the receiver-transmitter before transmission to the device port and to halt the operation of the device on the device port during the purge.

For reception of a frame from the device port, the controller programs the receiver-transmitter for a number of bits per character as a function of the number of bits per character of the line port protocol and for synchronization pattern as a function of the protocol of the line and device ports. More specifically, the receiver-transmitter is programmed during reception of bits from the device port for a synchronization pattern, which is a portion of the synchronization pattern of the device port protocol, resulting in a first data character including the remainder of the quotient of the data bits of the device port protocol divided by the number of bits per character to which the receiver-transmitter is programmed. The remaining bits of the first data character are device protocol synchronization bits.

Other objects, advantages, and novel features of the present invention will become apparent from the following detailed description of the invention when considered in conjunction with the accompanying drawings.

BRIEF DESCRIPTION OF THE DRAWINGS

FIG. 1 is a block diagram of a communications system in which the interface adapter of the pesent invention is used.

FIG. 2 is a block diagram of an interface adapter in which the Interface Logic of the present invention is used.

FIG. 3 is a representation of a frame transmitted to a device indicating the number of bits per character according to the principles of the present invention.

FIG. 4 is a representation of a frame received from a device indicating the number of bits per character according to the principles of the present invention.

FIG. 5 is a block diagram of an Interface Logic incorporating the principles of the present invention.

FIG. 6 is a logic diagram of the Facsimile Clock Control Logic according to the principles of the present invention.

FIG. 7 is a logic diagram of the $\overline{\text{Tx D}}$ Logic according to the principles of the present invention.

DESCRIPTION OF THE PREFERRED EMBODIMENTS

A communication interface adapter of the present invention is used in the system illustrated in FIG. 1 which includes a facsimile device (Fax) 10 connected to line 16 by an interface adapter 12 and a Modem 14. Also connected to line 16 is a second facsimile device 22 connected thereto by Modem 18 and interface adapter 20. The interface adapters 12 and 20 include, as illustrated in FIG. 2, a device port 24 and a line port 26. An internal parallel Bus 28 interconnects a Controller 30, Read/Write Memory 32, Read Only Memories 34, Timer 36 and Interface Logic 38. The Controller 30 is designed around a micro processor chip, for example, an Intel 8085, which serves as the master of the interface adapter to perform the required protocol conversion and control of the device and the communication line under program control. The instructions to be executed by the Controller are to be stored in the Read Only Memory 34 while the Read/Write Memory 32 acts as a temporary storage for data blocks, status vectors and other required information. The Timer 36, under software and manual control, provides the required timing functions of the interface adapter. The elements of circuitry which comprise the functional elements illustrated in FIG. 2 are well known and thus are not described in detail. Reference should be made to the patents discussed in the Background of the Invention for possible implementation of these elements. Preferably, however, the Purge Logic 50 is a D flip flop circuit such as Intel Models 74LS74 and 74LS08. The Read Only Memory 34 may be an Intel Model 2716 memory while the controller 30 is preferably an Intel Model 8085 microprocessor. The timer 36 may be an Intel 8523 timing circuit. Since the present invention lies in a new Interface Logic of block 38, it will be discussed in detail after an explanation of the problem the present invention was designed to accomodate and the resulting design philosophy.

The Interface Logic of the present invention was designed to address the problem presented by a facsimile machine, for example RAPICOM Model 412 or 450. These particular machines have a frame consisting of 585 bits of information of which the first 24 bits are used for synchronization. The last 16 bits of the frame are the cycle redundant check (CRC) remainder. Since these particular models of facsimile devices have no means to check the remainder no retransmit a frame, the role of the Interface Logic is limited to achieve frame synchronization during reception from the facsimile device, provide frame synchronization during transmission to the facsimile device, and to maintain frame integrity while either transmitting or receiving. Although the present invention was designed for a facsimile device, it should be noted that the design philosophy and circuit may be used for any device requiring special handling.

To illustrate the design philosophy, a 585 bit facsimile frame having 24 synchronization bits and 561 data bits as illustrated in FIGS. 3 and 4 will be used as the device protocol. The main purpose of the Interface Logic is to segregate or strip the 24 synchronization bits and provide the 561 bits of data as characters which may be transmitted on the line using the line protocol. For most line protocols, for example, 5, 6, 7 or 8 bits per character, the 561 bits of data per facsimile frame cannot be divided evenly. As by way of example, let it be assumed that the line protocol has 8 bits per character including 7 bits of data and a parity bit. Thus, the 561 bits of data of the facsimile frame will result in 80 characters with 1 bit of data remaining. Thus the interface logic must be capable of receiving 7 bits per character for eighty characters and an additional bit from the line to be grouped as a frame with 24 synchronization bits to be transmitted to the facsimile device and must be capable of stripping the 24 synchronization bits and dividing the 561 date bits of a facsimile frame from the facsimile device into 7 bits per character segments including the one remaining bit.

The line transmission is received and stored in the Read/Write Memory 32 as 8 bits per character including the 7 data bits and a parity bit. Also stored within either the Read/Write Memory 32 or the Read Only Memory 34 is the 24 bits synchronization code which is combined with the 561 bits of data received from the line to form a single facsimile frame. The synchronization code is selected to provide frame synchronization on a transmission to the facsimile device. Since the 24 bit synchronization code and remainder 1 bit of data are not conveniently handled on a 7 bit per character basis from the memory, a system must be provided which can handle these remaining 25 bits in the facsimile frame. Since data handling systems generally can handle 5, 6, 7, or 8 bits per character, it is suggested that the 25 remaining bits be handled on a 5 bit per character basis. This will result in the construction of a 585 bit fascimile frame to be transmitted to the facsimile device as including five 5 bit characters and eighty 7 bit characters as illustrated in FIG. 3. This will produce a facsimile frame having 24 bits of synchronization and 561 bits of data.

Thus it can be seen that to handle an odd size data frame for transmission to a device, the interface requires the handling capability of dividing its operation during a single frame into two portions having two data formats. The first data format handles the synchronization code, which is 24 bits, and the remainder of data bits which results from the quotient of the 561 data bits of the facsimile frame protocol divided by the 7 bits per character of the line protocol at 5 bits per character. The second portion is handled at the 7 bits per character of the line protocol. While the Interface Logic is being programmed for one of the two separate data formats or character per bits during the composition and transmission of a single frame to the facsimile device, the operation of the facsimile device must be halted. Otherwise, the facsimile device will continue to operate as a receiving device even though the Interface Logic is changing from a first data format to a second data format. This will cause loss of frame integrity. Bit level control of the operation of the facsimile device must be provided by the Interface Logic to prevent the loss of frame integrity.

The 585 bit facsimile frame received from the facsimile device must also be handled in a special way to convert it from the facsimile port protocol to the line port protocol. Using the 7 bits of data per character protocol of the line results in the same one data bit remainder as well as the inability to handle the 24 bit synchronization code. It is preferred that the extra bit of data, as illustrated in FIGS. 3 and 4, be at the beginning of the data frame such that the frame ends in an even amount in the last character. Since the synchronization code is to be stripped from the facsimile frame, it need not remain intact. Consequently, the Interface Logic may be programmed to a synchronization code which will result in a first data character having 7 bits per character including the total remainder of data bits, which in this example is 1. Since the sum of the synchronization bits and the remainder of data bits being 25 (24+1) and the number of bits per character to which the data is to be divided, namely 7, the quotient of 7 into 25 is 3 with the remainder of 4. Since most Interface Logic can operate with none, one, or two synchronization characters, and it is desired that the first data character includes only the remainder data bit, the Interface Logic is programmed to require two synchronization characters, resulting in the remainder of data bits in the first data character.

The first synchronization character to be recognized is defined to include the 5th through the 11the bit of the 24 bit synchronization pattern of the facsimile frame. Thus the first 4 bits, which is the remainder of 25 divided by 7, is ignored. The Interface Logic searches the synchronization pattern on a bit by bit basis until the first synchronization character including the 5th through 11th synchronization bits are recognized. The next 7 characters of the synchronization frame are searched on a character basis to provide the second synchronization character. The first data character as illustrated in FIG. 4 includes the remainder of the synchronization code and the remainder of data bits resulting from the quotient of the data bits of the facsimile device frame divided by the data bits per character of the line protocol, which in this case is 1. The interface adapter then strips the synchronization code and isolates the 1 bit remainder while quantitizing 560 bits of data of the facsimile frame in 7 bits per data character.

Since additional processing time may be required to strip the remainder data bits from the synchronization code, the facsimile device may be stopped during its transmission to the Interface Logic after reception of the first data character in the scheme of FIG. 4. Thus as in the transmission to the facsimile device, bit level control of the operation of the facsimile device must be provided. It should be noted that FIG. 4 represents only one method of handling reception of a facsimile frame from the facsimile device. For example, the Interface Logic may be programmed to search for one synchronization character having a bit per character length of, for example, 5. Thus the Interface Logic must be capable as in the transmission to the facsimile to operate in two different data modes or two different bits per character.

Thus, the design philosophy for handling the facsimile frame received from the facsimile device is to quantitize the frame using the bits per character of the line protocol, for example, the 7 data bits of the 8 bits per character line protocol and to select a synchronization pattern which results in a first data character to include the remainder of the quotient of the data bits of the facsimile frame, namely 561, divided by the number of bits per character of the line protocol program, namely 7, resulting in 1 remainder data bit and the other 6 bits being synchronization bits.

The Interface Logic 38 of the present invention achieves bit level control by controlling the clock of the device connected to device port 24 which in the present example is a facsimile device. By control of the clock, transmission or reception capability of the facsimile device may be halted in the middle of a facsimile frame. Also, to accomplish the functions described in the design criteria relative to FIGS. 3 and 4, the Interface Logic of the present invention is built around a universal synchronous/asynchronous receiver/transmitter (USART). The Controller 30 can program the USART to two different bit per character handling capability required for the transmission of a facsimile frame to the facsimile device as illustrated in FIG. 3 as well as programming it to recognize a specific synchronous pattern of the facsimile frame upon reception from the facsimile device. Control logic, which is programmed by the Controller, analyzes status signals from the USART and provides timing control of the USART and the facsimile clock as required to halt the facsimile device during reprogramming of the USART which occurs as illustrated in FIG. 3 in the middle of a facsimile frame transmission to the facsimile device.

An example of a system which will accomplish the design philosophy described relative to FIGS. 3 and 4 is illustrated in FIG. 5. The system includes a USART 40, a Facsimile Clock Logic 42, a Latch 44, $\overline{\text{Tx D}}$ Logic 46, Multiplexer 48 and Purge Logic 50. The USART 40 is connected to the 8 bit Parallel Bus 28 to receive and transmit data and control signals. The control signals provided by the Controller 30 from memory programs the USART for the number of bits per character and the mode of operation. Other control signals from the Controller 30 are Read Enable $\overline{\text{RD}}$, Write Enable $\overline{\text{WR}}$, Control or Data Enable $\overline{\text{C/D}}$, and Control Strobe $\overline{\text{C S}}$. USART 40 also has a clock input CLK. Other inputs to the USRT 40 are the Transmitter Clock $\overline{\text{Tx C}}$, Receiver Clock $\overline{\text{Rx C}}$, Receiver Data $\overline{\text{Rx D}}$, and Clear to Send Signal $\overline{\text{CTS}}$. The outputs of the USART used in the Interface Logic include Transmitter Ready $\overline{\text{TX RDY}}$, Receiver Ready $\overline{\text{Rx RDY}}$, Transmitter Empty $\overline{\text{Tx EMPTY}}$ and Transmitter Data $\overline{\text{TxD}}$. The USART 40 also has a Reset Terminal RESET. Multiplexer 48 includes three inputs, namely, Gated Facsimile Clock $\overline{\text{GFx C}}$ which is received from the Facsimile Clock Control Logic 42, Serial Data Input from the fascimile port $\overline{\text{TD/RD}}$ and Transmitter Data from $\overline{\text{Tx D}}$ Logic $\overline{\text{Tx DD}}$. The outputs of the Multiplexer are provided to the Receiver Clock $\overline{\text{Rx C}}$, Receiver Data $\overline{\text{Rx D}}$, and the Clear to Send $\overline{\text{CTS}}$ inputs of the USART 40 and Serial Data Output to the facsimile port $\overline{\text{RD/TD}}$. The Gated Facsimile Clock $\overline{\text{GFxC}}$ is combined with a software control bit D0 and purge signal p, which commands a USART reset, in Purge Logic 50 to provide an output to the USART Transmitter Clock Terminal input $\overline{\text{Tx C}}$.

The Transmitter Data Output $\overline{\text{Tx D}}$ of the USART is combined in the $\overline{\text{Tx D}}$ Logic 46 with software control signals D1 and D2 and clocked by Gated Facsimile Clock signals $\overline{\text{GFxC}}$ to provide a one bit delayed transmit data signal $\overline{\text{Tx DD}}$ which is the input to Multiplexer 48, and a serial output to the facsimile port signal $\overline{\text{RD/TD}}$. As will be explained more fully below, $\overline{\text{Tx D}}$ Logic 46 also controls the state of the signal transmitted to the facsimile port to either a marking or spacing state. The other outputs from USART 40, including Transmitter Registered Receiver signal $\overline{\text{Tx RDY}}$, Receiver Ready signal $\overline{\text{RX RDY}}$ and Transmitter Registered Empty signal $\overline{\text{Tx EMPTY}}$, are provided to the Facsimile Clock Control Logic 42 to be combined with the software control signals D3 through D7. D3 requests a Transmitter Empty signal $\overline{\text{Tx E}}$; D4 requests a Receiver Ready signal $\overline{\text{Rx S}}$; D5 requests a stop signal STOP; D6 requests a Transmitter Ready signal $\overline{\text{Tx R}}$; and D7 requests a Receiver Ready signal $\overline{\text{Rx R}}$. The combination of the status of the USART signals with the software command signals in the Facsimile Clock Control Logic 42 produces the Gated Facsimile Clock signal $\overline{\text{GFx C}}$ to control the USART 40 and the facsimile device by its clock to effectuate bit level control.

Latch 44 is connected to the 8 bit parallel Bus 28 and receives therefrom signals D0 through D7 which are used as control signals to program and control the USART 40 and the Facsimile Clock Control Logic 42. The control bit D0 is used to reset the USART 40. The primary purpose is to allow the Controller 30 to change the number of bits per character for synchronization generation and data formatting. Control bits D1 and D2 are used together to control the Transmit Data $\overline{\text{Tx D}}$ to the facsimile device when the facsimile device is sending information. Table 1 shows the four possible states for D1 and D2.

TABLE 1

| D1 | D2 | |
|---|---|---|
| 0 | 0 | Illegal combination. Transmit data is indeterminate. |
| 0 | 1 | Transmit data Tx D is held in the marking state (ones). This is used for answer-back when receiving from the Fax. |
| 1 | 0 | Transmit data Tx D is held in the spacing state (zeroes). This is the idle state during wait-up and document transmission when receiving from the Fax. |
| 1 | 1 | Allows transmit data Tx D for sending to the Fax. |

Control bit D3 is used to stop the facsimile clock when the USART transmitter register is empty. This allows the last character that was loaded into the transmitter register to be sent before the clocks are stopped. This control bit is used before the mode or data format of the USART is changed. Control bit D4 is used during reception of transmission from the facsimile device to stop the facsimile clocks when the USART receiver register has a character available. It is used at the beginning and end of a facsimile frame where a mode change is required. Control bit D5 is used to stop the facsimile clock during the transmission and reception of facsimile data and provides a means for throttling the facsimile device when buffers are either full or empty. Control bit D6 is used to stop the facsimile clocks during transmission to the facsimile when the transmitter register of the USART is ready. This feature is used to prevent synchronization fill when the number of bits per character to the facsimile device is less than the number of bits per character on the line. Control bit D7 is used to stop the facsimile clock during reception from the facsimile device when the USART receiver register is ready. This feature is used to prevent character overrun when the number of bits per character from the facsimile device is less than the number of bits per character on the line. Thus it can be seen that the Facsimile Clock Control Logic 42 by comparison of the status of the USART and Controller produced control signals provides the gated facsimile clock signal $\overline{\text{GFx C}}$ to stop the clocks of the facsimile device as well as stopping the USART 40.

To illustrate the operation of the Interface Control Logic 38, the operation of the transmission of data to the facsimile port will now be described. The transmission is started by resetting the USART and programming it for synchronous mode, 5 bits per character, one synchronization character of all zeroes, and transmitter and receiver enabled. This programming is performed through Bus 28 to Data Inputs D0 through D7 of the USART and the appropriate control pins. It should be noted that while changing the modes of the USART 40, the clocks are kept off by setting control bits D3 through D5 equal to 1 and D1 and D2 equal to 1 at Latch 44 since the transmission is from the USART 40 to the facsimile device. This maintains bit integrity between the facsimile frames. The sequence of commands from the Controller begins with D0 equal to 1 to activate the Reset of the USART 40 while maintaining the clocks off by D3 through D5 equals 1. Next, the Reset is removed by changing the D0 to zero. The USART is then programmed as previously described to 5 bits per character. The first five bit character from Bus 28 is loaded into the transmitter register of USART 40.

Since the present system is designed for bit level control, it is very important that no extra bits be inserted in the USART. Most systems are not concerned with this since they involve synchronization of the frame and transmission of the total frame. It has been found that generally the USART 40 inserts an extra bit after a reset operation. To purge this bit, control signal D0 is applied to the Purge Logic 50 so as to force the Transmit Clock $\overline{\text{Tx C}}$ of the USART 40 low while the facsimile clocks are kept off by the $\overline{\text{GFx C}}$ signal. The negative transition on the transmitter clock causes the USART 40 to purge itself of the extra data bit.

Since the transmit clock $\overline{\text{Tx C}}$ must be triggered to transit bits as well as purge the extra bit, the purge logic 50 performs an OR function of the Gated Facsimile Clock signal $\overline{\text{GFx C}}$ and of the control bit D0 and the purge signal P. $\overline{\text{GFx C}}$ drives the USART via $\overline{\text{Tx C}}$ for transmission through the purge logic 50. The control bit D0 may be applied to the data input of a D flip-flop and the purge signal P applied to the clock input after the USART has been programmed and before transmission to cause a negative transition on $\overline{\text{Tx C}}$. After the purge, control bits D3 through D5 to Latch 44 are set to zero to start the facsimile clocks. Data D6 is set to 1 to sense when the transmitter registers are ready and the second, third, fourth, and fifth 5 bit characters are loaded on reception on the transmitter ready signal $\overline{\text{Tx RDY}}$. Upon completion of the loading of the fifth character, the USRT 40 has transmitted a 24 bit synchronization code and a single bit of data which represents the remainder as discussed above. Data bit D3 is set to 1 to sense the transmitter empty status $\overline{\text{Tx EMPTY}}$ from the USART 40. This guarantees that the first 25 data bits have been transmitted before stopping the facsimile clock.

Once the facsimile clock has been stopped by sensing the transmitter going empty, $\overline{\text{Tx EMPTY}}$, D0 is set to 1 and D3 through D5 are set to 1, thereby holding the facsimile clock off and resetting the USART. D0 is then set to zero removing the reset while maintaining the clocks off and the USART 40 is programmed for the synchronous mode, 7 bits per character, 1 synchronous character of all zeros and the transmit and receiver enabled. The first data character is loaded and D0 to Purge Logic 50 is set to zero to purge the extra data bit in the transmitter register of USART 40. After the purge, D0 to Purge Logic 50 is set to 1 to allow the transmission of the data. The remaining 79 characters of 7 bits per character is transmitted to the facsimile device to complete a 585 bit facsimile frame having 24 synchronization bits and 561 data bits. During the 79th character, control bit D3 is set to 1 such as to sense when the transmitter empty signal $\overline{\text{Tx EMPTY}}$ is provided by the USART. This guarantees that the last data bit has been transmitted before stopping. The sequence is repeated to transmit the next facsimile frame.

During transmission to the facsimile device, the facsimile device will send back two answers, one after wait-up and the other after the ending set-up data. The answer back is checked by monitoring the received data input $\overline{\text{TD/RD}}$ by testing for all ones. During the time the answerback is occuring, the USART 40 is sending synchronization fill to the facsimile, namely all zeros. Thus it can be seen that the USART 40 is capable of being programmed by the Controller 30 to operate at a first number of bits per character during a first portion of a facsimile frame and a separate distinct number of bits per character during the second portion of a facsimile frame. By providing bit level control of the facsimile device through its clock, the facsimile device may be stopped so as not to lose synchronization within a frame wherein the USART is programmed in the middle of a frame.

To further understand the operation of the Interface Logic 38, the reception of a frame from the facsimile device will also be described. The reception is started by performing a reset of the USART and programming the USART for synchronous mode, 7 bits per character, 2 synchronization bits and the transmitter and receiver enabled. During reception of transmission from the facsimile device, the Transmit Data $\overline{\text{Tx D}}$ must be held in the spacing state (namely control bits D1 equal to 1 and D2 equal to zero on Latch 44 except when an answerback is required wherein D1 equals zero and D2 equals 1 on Latch 44). The complete sequence follows.

Control bit D1 is set equal to 1 to reset the USART, D3 through D5 are equal to 1 to keep the clocks off, D1 is equal to 1 and D2 is equal to zero to hold the transmit signal $\overline{\text{Tx D}}$ in a spacing state. Control bit D0 is then set to zero to remove the reset signal and the clocks are maintained off. The USART is then programmed as described for the 7 bits per character and 2 synchronization characters so selected to have a first synchronization character of 0010011 and a second synchronization character of 1100111. The USART 40 then begins monitoring the serial data received from the facsimile device on $\overline{\text{TD/RD}}$ which is provided at $\overline{\text{Rx D}}$ on the USART 40 from Multiplexer 48. Once a bit by bit match of the first synchronization character 0010011 is made, a character match for the second synchronization character is performed. Control bit D7 on Latch 44 is set to 1 to stop the facsimile clocks when the USART 40 indicates that the receiver register is ready. This indicates the availability of the first data character which includes the synchronization codes bits 011000 and the first data bit. The first data bit is read from D6 of the parallel output D0 through D7 of the USART 40. Using this scheme of FIG. 4, the USART does not require reprogramming and the remainder of bits from the facsimile frame can be quantitized using 7 bits per character. Thus, the control bits to Latch 44 are set such that the USART can continue to receive bits from the facsimile device and the facsimile clock enable the facsimile device to transmit the remainder of 560 data bits in the facsimile frame.

If the scheme to receive the facsimile frame requires a different number of bits per character than to isolate the synchronization and the remainder of the data frames, the USART is reprogrammed before the clocks are enabled. When the second to last character is received, control bit D7 is set to 1. This will stop the facsimile clock when the last character becomes available. This character can then be read and the reception from facsimile sequence can then be reinitiated to receive another facsimile frame.

During the reception of data from the facsimile, answers are required after the wait-up is received and after the ending set up data is received. The answerback is generated by sending all ones to the facsimile device for one second. The Transmit Data $\overline{\text{Tx DD}}$ is held in the marking state, namely all ones. Thus it can be seen that by providing bit level control, the USART 40 can isolate the remainder of the data bits in a data frame which is not evenly divisable by the bits per character of the line protocol and allows retrieval of the remainder. The USART and the facsimile device are stopped in the middle of frame reception from the facsimile in such a way as not to lose frame synchronization.

A specific circuit for the Facsimile Clock Control Logic 42 is illustrated in FIG. 6 which provides the needed control of the facsimile clock. Data control bit D3, which requests a Transmitter Empty signal $\overline{\text{Tx E}}$, is used as the D input to a flip-flop 52 with the Transmitter Empty status $\overline{\text{Tx EMPTY}}$ from USRT 40 applied to the C input of flip-flop 52. Control bit D4 for the Receiver Ready signal $\overline{\text{Rx RS}}$ is provided to the D input of flip-flop 54 whose C input monitors the Receiver Ready status $\overline{\text{Rx RDY}}$ of USART 40. The Q output of flip-flop 50 and 54 are combined at OR gate 56 which is connected by inverter 60 to the PR input of flip-flop 62. Control bit D6 for the Transmitter Ready request $\overline{\text{Tx R}}$ is compared with the Transmitter Ready status $\overline{\text{Tx RDY}}$ of USART 40 at AND gate 64 and the control bit D7 for the Receiver Ready $\overline{\text{Rx R}}$ is compared with the Receiver Ready status $\overline{\text{Rx RDY}}$ at AND gate 66. The outputs of AND gates 64 and 66 are combined at OR gate 68 whose output is combined at OR gate 70 with the control bit D5 which requests a stop. The output of OR gate 70 is connected to the D input of flip-flop 62 whose C input is connected to the line Transmitter Clock Line $\overline{\text{Tx C}}$. The Q output of flip-flop 62 is combined with the line Transmitter Clock Line $\overline{\text{Tx C}}$ at OR gate 72 to provide the Gated Fascimile Clock signal $\overline{\text{GFx C}}$. By review of this logic, it can be seen that the Facsimile Clock Control Logic 42 provides the necessary control of the facsimile clock in response to the programming of the Controller using the control bits D3 through D7 and the status of the USART transmitter and receiver registers.

The Tx D Logic 46 is illustrated in FIG. 7 as including a flip-flop 74 having its D input connected to the Transmit Data output $\overline{\text{Tx D}}$ of the USART 40. The PR pin is connected to control bit D1 and the $\overline{\text{CLR}}$ input is connected to control bit D2. The C input of flip-flop 74 and the CLK input of flip-flop 72 are connected to the Gated Facsimile Clock signal $\overline{\text{GFx C}}$. The Q output of flip-flop 74 is connected to the J input of flip-flop 76 and the $\overline{Q}$ output of flip-flop 74 is connected to the K input of flip-flop 76. The Q output of flip-flop 76 is the Transmit Data Delay signal $\overline{Tx\ DD}$. By reviewing this logic in combination with the Table 1 for control signals D1 and D2, it is evident that the $\overline{Tx\ D}$ logic 46, as illustrated in FIG. 7, will delay the Transmit Data $\overline{Tx\ D}$ one bit as controlled by the transition of the Gated Facsimile Clock Control signal $\overline{GFx\ C}$ and will also be held in a mark of space state depending upon the conditions of control bits D1 and D2.

From the preceding description of the preferred embodiment, it is evident that the objects of the invention are attained and that a unique communication interface adapter has been described which can handle efficiently odd sized data frames by maximizing the programming capability of a USART through bit level control of a transceiver device. Although the invention has been described and illustrated in detail, it is to be clearly understood that the same is by way of illustration and example only and is not to be taken by way of limitation. Although the USART 40 has been described as an universal synchronous/asynchronous receiver/transmitter programmed for synchronous operation a universal synchronous receiver/transmitter may be used. Similarly, the use of the system for a specific facsimile device is only by way of example. Other types of transmitter/receiver which have a difficult to handle number of bits per frame may also be handled by appropriate programming of the present system. The spirit and scope of this invention are to be limited only by the terms of the appended claims.

What is claimed:

1. In a communications adapter for interfacing a facsimile transceiver with a communications line comprising controller means for controlling the operation of the adapter, storage means for storing instruction and data to be used by said controller means, facsimile input-output port, a line input-output port, and logic means controlled by said control means for interfacing said facsimile and line ports, the improvement being said logic means which comprises:

a receiver/transmitter means programmable by said controller means for interfacing said facsimile and line ports;

synchronization means programmable by said controller and responsive to signals from said receiver/transmitter means for providing a signal to coordinate the transmission and reception of a facsimile transmitter/receiver on said facsimile port with the interface adapter on the bit level; and said storage means including instructions to program said receiver/transmitter means and said synchronization means.

2. The communications adatper according to claim 1 wherein said synchronization means provides a signal to control the clock of a facsimile transmitter/receiver on said facsimile port to achieve control of the facsimile machine.

3. The communications adapter according to claim 1 wherein said controller means programs said receiver/transmitter means to operate in a first data format for a first portion of a frame transmission to said facsimile port and a second data format for a second portion of a frame transmission to said facsimile port and said controller means programs said synchronization means to provide a signal to halt operation of a facsimile transmitter/receiver during programming of said receiver/transmitter means.

4. The communications adapter according to claim 3 wherein said controller means provides synchronization bits from said storage to said receiver/transmitter means during said first portion of said frame and provides data bits received from said line port to said receiver/transmitter means during said second portion of said frame.

5. The communications adapter according to claim 3 wherein the controller means programs said receiver/transmitter means to a first number of bits per character as a function of the number of bits per frame of the facsimile port protocol and the number of bits per character of the line port protocol for said first data format and to a second number of bits per character as a function of the bits per character of the line port protocol for said second data format.

6. The communications adapter according to claim 3 wherein said controller means programs said synchronization means to purge said receiver/transmitter means of one bit after programming and before transmitting to said facsimile port and to provide a halt signal to the facsimile port during the purge.

7. The communications adapter according to claim 1 wherein said controller means programs said receiver/transmitter means for a number of bits per character for data received from the facsimile port as a function of the number of bits per character of the line port protocol and programs said receiver/transmitter means for a synchronization pattern as a function of number of bits per character programmed and the number of bits per frame of the facsimile port protocol.

8. The communications adapter according to claim 1 wherein said receiver/transmitter means is programmed to operate in a synchronous mode.

9. The communications adapter according to claim 1 wherein said receiver/transmitter means converts parallel data to serial data output to said facsimile port and converts serial data from said facsimile port to parallel data.

10. A communications adapter for interfacing a transmitter/receiver and a line comprising: a transmitter/receiver port;

a line port;

a programmable synchronous receiver/transmitter means for interfacing the protocol of said line and transmitter/receiver ports;

programmable logic means responsive to signal from said receiver-transmitter means for enabling the operation of a transceiver on said transmitter/receiver;

storage means for storing instructions and data; and controller means interconnected to said receiver/transmitter means, logic means and storage means for programming said receiver/transmitter means to operate in a first data format for a first portion of a frame transmission to said transceiver port and a second data format for a second portion of a frame transmission to said transmitter/receiver port and for programming said logic means to halt operation of a transmitter/receiver on said transmitter/receiver port during programming of said receiver/transmitter means.

11. The communications adapter according to claim 10 wherein the controller means programs and receiver/transmitter means for a first number of bits per character for said first portion of a frame transmission as a function of transmitter/receiver port protocol and line port protocol and for a second number of bits per character for said second portion of frame transmission as a function of line port protocol.

12. The communications adapter according to claim 11 wherein said controller means programs said receiver/transmitter means at said first number of bits per character as a function of the number of synchronization bits of the transmitter/receiver port protocol and as a function of the remainder of the quotient of the data bits of the transmitter/receiver port protocol divided by said second number of bits per character.

13. The communications adapter according to claim 12 wherein said storage means stores the synchronization bits of the transceiver port protocol and said controller means provides said stored synchronization bits and said remainder data bits to said receiver/transmitter means during said first portion of frame transmission to said transmitter/receiver port.

14. The communications adapter according to claim 11 wherein said controller means programs said receiver/transmitter means to receive line port bits in parallel and transmit bits to said transmitter/receiver port in series.

15. The communications adapter according to claim 10 wherein controller means programs said logic means to purge one bit from said receiver/transmitter means after programming of said receiver/transmitter means and before transmission to said transmitter/receiver port and to halt operation of a transmitter/receiver on said transceiver port during the purge.

16. A communications adapter for interfacing a transmitter/receiver and a line comprising:
   a line port;
   a transmitter/receiver port;
   a programmable synchronous receiver/transmitter means for interfacing the protocol of said line and transmitter/receiver ports;
   programmable logic means responsive to signals from said receiver/transmitter means for enabling the operations of a transmitter/receiver on said transmitter/receiver port;
   storage means for storing instructions; and
   controller means interconnected to said receiver/transmitter means, logic means and storage means for programming said receiver/transmitter means to operate in a first data format for transmission of a frame to said transmitter/receiver port and in a second data format for reception of a frame from said transmitter/receiver port, and for programming said logic means to halt operation of a transmitter/receiver on said transmitter/receiver port during programming of said receiver/transmitter means.

17. The communications adapter according to claim 16 wherein said controller means programs said receiver/transmitter means during reception of bits from said transmitter/receiver port for a number of bits per character as a function of the number of bits per character of the line port protocol and for a synchronization pattern as a function of the protocol of the line and transmitter/receiver ports.

18. The communications adapter according to claim 17 wherein said controller means programs said receiver/transmitter means during reception of bits from said transmitter/receiver port for a synchronization pattern resulting in the first character of data including the remainder of the quotient of the data bits of the transmitterreceiver port protocol divided by the number of bits per character programmed and transmitter/receiver synchronization bits.

19. The communications adapter according to claim 18 wherein said controller means programs said receiver/transmitter means to monitor the synchronization pattern of the transmitter/receiver port's synchronization protocol on a bit by bit basis to match a character selected to result in said first data character including said data remainder bits.

20. The communications adapter according to claim 18 wherein said logic means is programmed to halt operation of a transmitter/receiver on said transmitter/receiver port after reception of said first character of data and said controller means separates said data remainder bits from the synchronization bits in said first data character.

21. The communications adapter according to claim 20 wherein said logic means is programmed by said controller means to continue reception of the remainder of the characters of a frame from a transmitter/receiver on said transmitter/receiver port after said controller means separates said data remainder bits.

* * * * *